C. W. TAYLOR.
POWER TRANSMISSION MECHANISM.
APPLICATION FILED NOV. 4, 1912.
1,062,934.
Patented May 27, 1913.
2 SHEETS—SHEET 1.
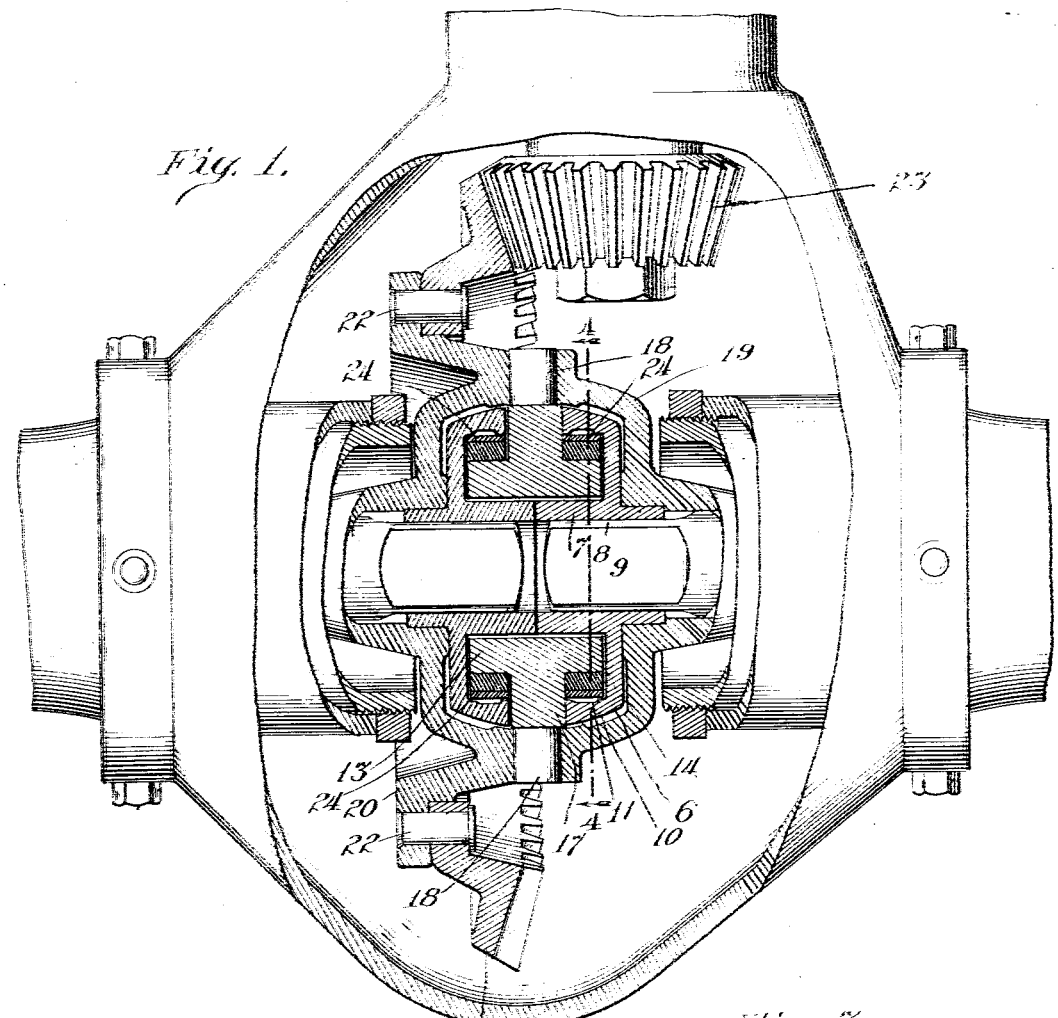
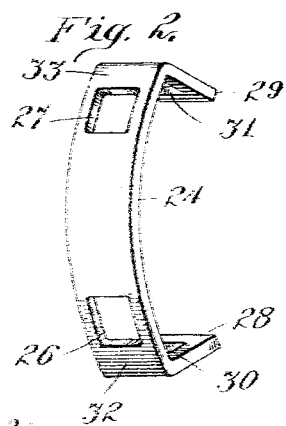
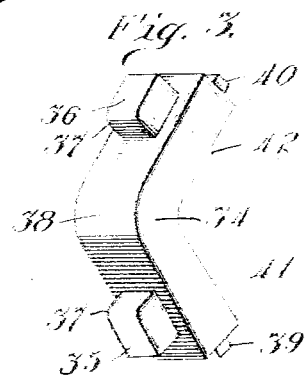
Witnesses:
Inventor C. W. TAYLOR.
POWER TRANSMISSION MECHANISM.
APPLICATION FILED NOV. 4, 1912.
1,062,934.
Patented May 27, 1913.
2 SHEETS—SHEET 2
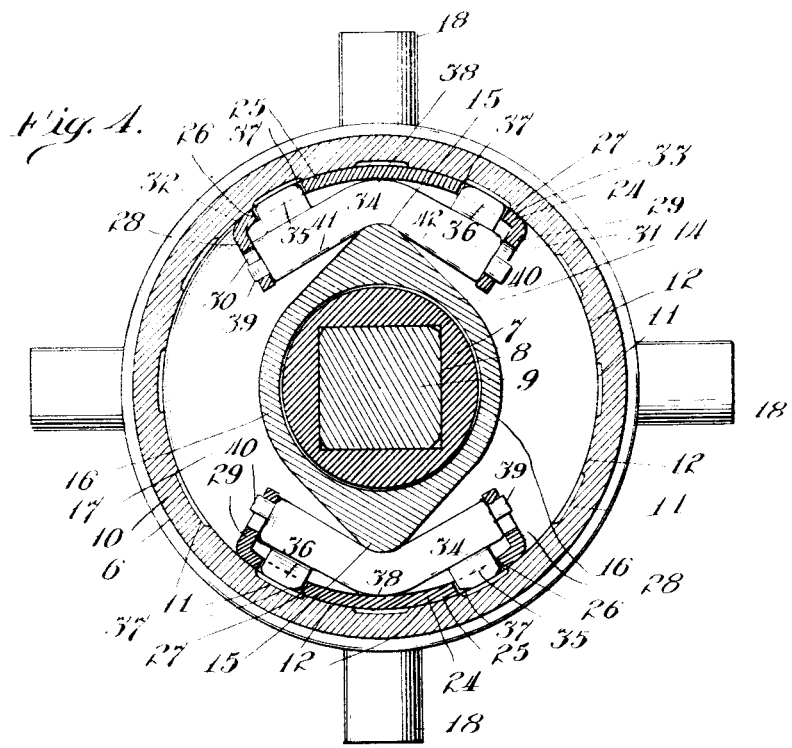
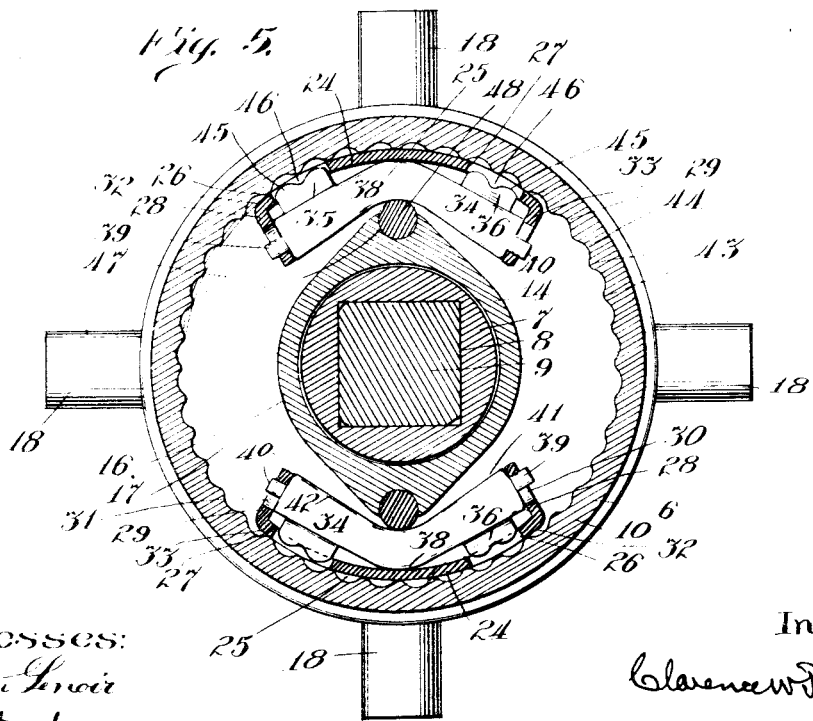
Witnesses:
Milton Sinair
R. F. Stout
Inventor.
Clarence W. Taylor

UNITED STATES PATENT OFFICE.

CLARENCE W. TAYLOR, OF CHICAGO, ILLINOIS, ASSIGNOR TO AGNES POAGE TAYLOR, OF CHICAGO, ILLINOIS.

POWER-TRANSMISSION MECHANISM.

1,062,934.  Specification of Letters Patent.  Patented May 27, 1913.

Application filed November 4, 1912. Serial No. 729,208.

*To all whom it may concern:*

Be it known that I, CLARENCE W. TAYLOR, a citizen of the United States, residing at Chicago, in the county of Cook and State of Illinois, have invented certain new and useful Improvements in Power-Transmission Mechanism, of which the following is a specification.

My invention relates to power transmission mechanism, particularly to devices for prompt and effective engagement and release between driving and driven parts to actuate the driven part in either direction and to permit the driven part to independently disengage and revolve faster than the driving part in either direction; and the objects of my improvement are, first, to afford a drag or brake, preferably operable by the driver and effective against the driven part; second, the provision of a construction which, when employed as a differential in motor vehicles, will not be operable by the driven part to lock one vehicle wheel against the other; third, to provide a coupling-unit of few parts and of great strength, adapted to occupy limited space; and, fourth, to produce a device whereby there will be a two-wheel drive when the speeds of the vehicle wheels are equal.

With the above and other objects in view, my invention consists in the novel features, and in their mode of operation, and in the novel combination and arrangement of parts hereinafter fully described, illustrated in the accompanying drawings forming a part of this specification and particularly pointed out in the claims hereunto appended.

In describing the invention in detail, reference is had to the accompanying drawings wherein like reference characters indicate corresponding parts throughout the several views, and in which—

Figure 1 is a horizontal central section of a rear axle of a motor vehicle with my invention applied thereto. Fig. 2 is a perspective view of the elastic drag-plate detached. Fig. 3 is a perspective view of a detached clutch-member. Fig. 4 is a section on line 4—4 of Fig. 1. Fig. 5 is a modified form of my invention.

One embodiment of my present invention consists of a driver and a driven part with a coupling-unit therebetween composed essentially of a drag, brake or anchor and a clutch member operable by the driver in either direction.

The device is adapted to be employed in the space in rear axles now used for the common form of differentials in automobiles and trucks. There are varied uses to which my invention may be put and I do not in any way limit its scope of usefulness.

Referring to the drawings for a more detailed statement, 6 desigates a clutch-drum having an inwardly extending hub 7 with a square opening 8 therethrough to receive the squared end 9 of the shaft. The flange or rim 10 of the clutch-drum 6 has formed in its inner surface recesses 11 with intervening solid portions 12.

Integral with or attached to a driver hereinafter more particularly described, are lugs 13 or cams on one side and lugs or cams 14 on the other side, each having points or extremities 15, one of each of which it will further appear drives or actuates a locking-unit described in this specification. The body portion 16 of the lugs affords strength. The annular ring portion 17 of the driver carries radial studs 18 which are suitable for insertion in the openings made for the common differential. The housing 19 has an annular flange 20 with the usual bevel gear wheel 21 riveted thereto at 22.

23 denotes a pinion on the driver shaft not shown.

For the purpose of setting up power transmission engagement and facilitating prompt release between the driving and driven-members, I have constructed what is termed a coupling-unit comprising a drag-plate, brake or anchor 24 and a clutch-member 34. The drag-plate 24 is fulcrumed intermediate its ends. It has a curved or flexed portion 25 and its free ends are formed to slidably engage with the ends of the clutch-member for movement of one end at a time of the drag plate with the clutch-member and to force the other end against the driven member. The amount of drag or retardation thus effected depends upon the nature of the two surfaces and upon the pressure upon them. Different conditions require varying degrees of drag or anchorage.

One coupling-unit is sufficient for rotation of the driven member in either direction for light work. In pleasure motor-vehicles two coupling-units are preferable, and in heavy trucks a larger number of coupling-units are desirable. The bent ends 28 and 29 of the plate 24 have elongated slots 30 and 31 for travel of the clutch member pins 39 and 40. The brake surfaces 32 and 33 of the plate 24 may be provided with faces yielding greater friction than steel to steel or cast iron if preferred. The clutch member 34 is formed with studs or projections 35 and 36. Preferably the inner corners 37 of the studs are rounded to facilitate prompt disengagement when the driven member's speed exceeds that of the driver.

38 designates the apex or fulcrum of the member 34 on which the lever 24 is fulcrumed when the coupling-nut is operated.

The pins 39 and 40 of the member 34 travel in the slots 30 and 31, and normally are positioned at the lower ends of the slots. Preferably the plate 24 is made of spring steel and the ends are bent as shown, but the body portion is flexed (not bent) when the unit is assembled which puts the plate 24 under tension all the time, greater of course when coupling is effected. On the back of the clutch-member are formed reversed planes 41 and 42 against which the driver operates.

It will be noted the driver increases the application of friction against the driven member until power transmission engagement is established between the driven member and the driver through the coupling-unit, when the parts rotate together. It will be noted also that in my present embodiment the drag-plate, with its leverage against the driven member, and the clutch-member are actuated by the driving member, and the application of friction is prompt and powerful. It will further be noticed that the drag-plate or brake which is preferably made of spring steel, constantly urges the clutch member to normal disengaged position, and therefore only when the driver forces it into commission is it in position to interfere with the free rotation of the driven member. The extent of surface of the drag-plate against or adjacent to the driven member gives the coupling-unit stability.

Normally the small amount of friction between the adjacent faces of the drag-plate and the driven member is not sufficient to project or move the coupling-unit against the driver to effect the locking of one vehicle wheel against the other. The drag-plate serves as a lever, which is operated by the driver, to maintain at least a comparative state of rest of the driven member until coupling is effected, when first the parts are placed in power transmission relation. After disengagement of the driven member for example when the outer wheel has described a longer radius curve and the speeds of the driven member and the driver are approaching each other the drag-plate serves as a brake to slow down the driven member to the rate of speed of the driver to facilitate the coupling of the outer vehicle wheel with the source of power.

It will be seen that the coupling of the driven member with the driver will be more readily effected when their rates of speed are substantially alike. When first starting by means of the drag-plate the coupling is made before speed of the driver is attained. In the present embodiment the clutch member is pivoted on the driver. The machine elements of the coupling-unit are levers and inclined planes, the latter being oppositely positioned on the back of the clutch-member.

In Fig. 5 I have shown a modification of the outer faces of the studs 35 and 36 of the clutch member 39 and of the adjacent engaging surface of the driven member or clutch-drum 6. The ridges 43 and the grooves 44 between ridges in the driven member are formed to receive the ridges 45 and grooves 46 on the studs or engaging faces of the clutch member. To lessen friction of the driver with the planes 41 and 42 of the clutch-member, I have provided a roller seat 47 and a roller 48. Where great power is employed these anti-friction rollers are preferred. The recesses or sockets 11 are spaced and the projections or studs 35 and 36 are of a predetermined distance apart to insure registering of the several recesses and projections of the different coupling units when one goes into commission in the positive drive form. This is true also of the modification in Fig. 5 in which the ridges and grooves are transverse to the plane of rotation. Lever means for resistance to the relative motion of the driven member surface and coupling means is an important feature of my present invention and I wish to be understood as claiming it broadly.

While I prefer to employ an elastic drag-plate or brake as shown and described in this application, I do not limit my invention to any special construction of drag-plate or grapple.

In operation, let it be assumed the parts in normal position out of power transmission engagement and the vehicle wheels at rest. When the driver is actuated in either direction the pivot 15 will be moved against one of the planes, 41 or 42, and the plane forced toward the driven member and with it will be drawn inwardly the opposite end of the elastic drag-plate, the power end of the lever, and instantly the weight or load-end of the lever (the end of the drag-plate left in contact with the driven member) will exert a drag or brake against the driven member equal to the force of the driver less the tension of the elastic drag-plate, which will be sufficient to anchor the coupling-unit to the driven member until coupling is effected when the coupled parts will rotate together. When either vehicle wheel describes a longer radius curve, if its tire maintains a rolling contact with the road surface, it will rotate at an increased speed and instantly the coupling-unit will be carried ahead and out of and free from the force of the driver when the elastic drag-plate will rock the clutch-member to normal disengaged position where it will remain until the driver again exerts sufficient force against one of the inclined planes of the clutch member to put in coupled engagement with the driven member and so on in either direction. When the force of the driver is discontinued, as it is when the driven member races ahead when its vehicle wheel is describing a longer radius curve, the flexed spring or elastic drag-plate 24 instantly shifts the clutch member 34 to normal disengaged position, in which position it will remain until force of the driver again is employed. The parts are formed of such dimensions that there is little if any friction between the drag-plate and the driven member, excepting when force from the driver is applied to the clutch member. The arc of the flexed elastic drag-plate and the arc of the adjacent driven member are of different radii. On release of the drag-plate from the force of the driver it becomes a perfect arc of a circle and the driven member is free to rotate in either direction.

It is understood that changes, variations and modifications in the details of my present invention within the scope of the claims, may be resorted to without departing from the spirit or sacrificing any of the advantages thereof, hence I do not limit myself to the exact construction and arrangement of the part shown and described, but

Having thus fully described my invention, what I claim as new, and desire to secure by Letters Patent is,—

1. In a power transmission mechanism, a coupling-unit comprising a drag-plate and a clutch-member both operable by a driving member.

2. In a power transmission mechanism, a coupling-unit comprising an elastic drag-plate and a clutch-member having a plurality of faces for engagement with a driven-member, the drag-plate and the clutch member being formed and mounted for relative movement.

3. A power transmission mechanism comprising, in combination with a driving member and a driven member, a fulcrumed drag-plate positioned to exert force against the driven member and a clutch-member having a plurality of engaging studs on one side and reversed-plane-surfaces on the other side and operable by the driving member.

4. A power transmission mechanism comprising, in combination with independent shafts and a clutch-drum fixed to one end of each shaft and a driving member, a drag-plate-lever adjacent each clutch-drum and a clutch-member adapted to be actuated by the driving member.

5. A power transmission mechanism comprising, in combination with a driving member and a driven member, lever means for drag effort between said members.

6. A power transmission mechanism comprising, in combination with a driving member and a driven member, a coupling unit having a rocking clutch-member, and an elastic drag-plate having a movement relative to the clutch-member.

7. In a power transmission mechanism, in combination with a driving member and a driven member, an elastic drag-plate formed or flexed to the arc of the driven member, and a rocking clutch-member held in normal position by the elastic drag-plate and formed on one side to be operated by said driving member.

8. A power transmission mechanism comprising, in combination with a driving member carrying a cam and a driven member having an annular series of recesses and solid portions alternating, a coupling-unit comprising a drag-plate mounted for lever action against the driven member and a rocking clutch-member having a plurality of studs on one side adapted to enter the recesses and formed on the other side to be actuated by said cam.

9. A power transmission mechanism comprising in combination with independent shafts and a clutch-drum fixed to one end of each shaft and a driving member, a drag-plate formed or flexed to the arc of each clutch - drum and rocking - clutch - members held in normal disengaged position by the respective drag-plates and formed on one side to be operated by the driving member, the drag-plates and the clutch-members having relative movement.

In testimony whereof I affix my signature in presence of two witnesses.

CLARENCE W. TAYLOR.

Witnesses:
C. RICHARD BETTS,
JOHN E. LYNCH.

Correction in Letters Patent No. 1,062,934.

It is hereby certified that in Letters Patent No. 1,062,934, granted May 27, 1913, upon the application of Clarence W. Taylor, of Chicago, Illinois, for an improvement in "Power-Transmission Mechanism" an error appears in the printed specification requiring correction as follows: Page 2, line 16, for the compound word "coupling-nut" read *coupling-unit;* and that the said Letters Patent should be read with this correction therein that the same may conform to the record of the case in the Patent Office.

Signed and sealed this 24th day of June, A. D., 1913.

[SEAL.]

C. C. BILLINGS,

*Acting Commissioner of Patents.*